United States Patent [19]
Lauritzen et al.

[11] Patent Number: 5,623,115
[45] Date of Patent: Apr. 22, 1997

[54] INFLATOR FOR A VEHICLE AIRBAG SYSTEM AND A PYROGEN IGNITER USED THEREIN

[75] Inventors: Donald R. Lauritzen, Hyrum; David J. Green, Brigham City; Joseph L. Ralston, No. Ogden, all of Utah

[73] Assignee: Morton International, Inc., Chicago, Ill.

[21] Appl. No.: 453,842

[22] Filed: May 30, 1995

[51] Int. Cl.⁶ .................... C06C 5/06; C06D 5/06
[52] U.S. Cl. ............ 102/288; 102/289; 102/275.11; 102/275.6; 102/202.12
[58] Field of Search .................. 102/288, 289, 102/275.6, 275.11, 202.5, 202.12

[56] References Cited

U.S. PATENT DOCUMENTS

| | | | |
|---|---|---|---|
| 2,995,088 | 8/1961 | Asplund | 102/70 |
| 3,002,459 | 10/1961 | Harper | 102/98 |
| 3,067,686 | 12/1962 | Coover et al. | 102/98 |
| 3,090,196 | 5/1963 | Brewer | 60/35.6 |
| 3,260,208 | 7/1966 | Schluter | 102/98 |
| 3,340,809 | 9/1967 | Stadler et al. | 102/39 |
| 3,367,268 | 2/1968 | Spenadel | 102/102 |
| 3,392,673 | 7/1968 | King | 102/202 |
| 3,429,264 | 2/1969 | Oversohl et al. | 102/100 |
| 3,703,080 | 11/1972 | Longwell | 60/219 |
| 3,779,819 | 12/1973 | Thomas et al. | 102/288 X |
| 3,811,358 | 5/1974 | Morse | 102/287 |
| 3,918,365 | 11/1975 | Arribat | 102/39 X |
| 4,005,876 | 2/1977 | Jorgensen et al. | 280/741 |
| 4,084,512 | 4/1978 | San Miguel | 102/103 |
| 4,148,187 | 4/1979 | Younkin | 60/245 |
| 4,466,352 | 8/1984 | Dalet et al. | 102/288 |
| 4,561,675 | 12/1985 | Adams et al. | 280/734 |
| 4,722,551 | 2/1988 | Adams | 280/736 |
| 4,754,704 | 7/1988 | Lubbers | 102/275.11 |
| 4,821,511 | 4/1989 | Felix et al. | 102/287 X |
| 4,846,368 | 7/1989 | Goetz | 102/288 X |
| 4,878,690 | 11/1989 | Cunningham | 141/114 X |
| 4,902,036 | 2/1990 | Zander et al. | 280/736 |
| 4,922,823 | 5/1990 | Rahnenführer et al. | 102/275.11 X |
| 5,062,367 | 11/1991 | Hayashi et al. | 102/530 |
| 5,101,730 | 4/1992 | Bender et al. | 102/288 |
| 5,109,772 | 5/1992 | Cunningham et al. | 102/275.11 |
| 5,409,259 | 4/1995 | Cunningham et al. | 102/202.5 X |
| 5,431,103 | 7/1995 | Hock et al. | 102/287 |

*Primary Examiner*—Peter A. Nelson
*Attorney, Agent, or Firm*—Henry W. Tarring, II; Gerald K. White

[57] ABSTRACT

An elongated gas generator, or inflator, includes a pyrogen igniter mounted at one end thereof. The pyrogen igniter encloses a unitary grain of ignition material having a centrally located cavity. An initiator, or squib, is located to ignite the unitary grain at the surface of its centrally located cavity. The combustion products given off by the igniter are directed through a port and into a clear ignition channel provided in the center of the pyrotechnic gas generant material which extends the length of the gas generator, thereby causing the gas generant material to produce sufficient gas to inflate an associated airbag. The unitary grain of ignition material used in the pyrogen igniter facilitates and simplifies the assembly and manufacture of the igniter structure.

33 Claims, 4 Drawing Sheets

INFLATOR FOR A VEHICLE AIRBAG SYSTEM AND A PYROGEN IGNITER USED THEREIN

BACKGROUND OF THE INVENTION

1. Field of the Invention

This invention relates to igniters used to activate gas generators, or inflators, for inflating airbags in vehicle occupant passive restraint systems.

2. Description of Prior Art

Airbags which actuate in response to a collision to protect the occupants of a vehicle from more serious injury by providing a cushion between the occupants and the interior surfaces of the passenger compartment have become increasingly popular in modern vehicles due to their proven effectiveness. Airbag systems typically include one or more airbags mounted in a folded, deflated condition in a storage area in the passenger compartment. In the event of a collision, a crash sensor mounted on the vehicle's frame or body detects the sudden deceleration of the vehicle and electrically triggers activation of the airbag. Typically, an airbag system includes a gas generator, or inflator, which contains a pyrotechnic gas generating material, or gas generant, which is capable, upon ignition, to rapidly form sufficient gas to inflate the associated airbag. The system also includes an initiator, such as an electric squib, and an igniter. Upon receipt of a triggering signal from the crash sensor, the initiator fires causing the rapid combustion of material in the igniter, which, in turn, ignites the gas generant.

Airbag systems used on the passenger side of vehicles are usually mounted at a location behind the instrument panel/dashboard. Such systems usually include a gas generator having a cylindrical housing. An electric initiator, or squib, is located at one end of the housing so as to fire upon a linear igniter comprising an igniter tube extending along the axis of the housing. The igniter tube is loaded with igniter granules, and often includes a fuse of rapid deflagration cord (RDC) extending along the tube's axis and surrounded by igniter granules to assure even ignition throughout the length of the inflator. One end of the igniter tube is closed with a screen which retains the igniter granules while permitting ignition of the granules by an auto-ignition device in the event of a vehicle fire. An exposed length of the RDC and a stand off distance of the igniter are critical features which must be closely monitored during assembly of the inflator. The gas generant material, in pellet or wafer form, surrounds the igniter tube along the length of the housing. The gas generant material, in turn, is surrounded by a filtering and cooling structure which cools the generated gas and filters particulates therefrom, prior to the gas discharging through openings in the cylindrical wall of the housing to the interior of the airbag, thereby inflating same. Igniters of the type described are more fully described in U.S. Pat. No. 4,005,876, to Jorgenson et al., issued Feb. 1, 1977, and U.S. Pat. No. 4,878,690, to Cunningham, issued Nov. 7, 1989. Many variations of the prior art inflators and their linear igniters are presently in use and work well. However, the igniters require labor intensive assembly and are comprised of many components, some of which are costly.

Igniters have also been designed to be mounted at one end of elongated cylindrical gas generators. Such an igniter, which uses a particulate or granular ignition material, is described in commonly assigned U.S. Pat. No. 5,409,259, granted Apr. 25, 1995 to cunningham et al.; and in a continuation-in-part application of that patent, Ser. No. 08/106,291, entitled "Gas Generator For Vehicle Occupant Restraint System", filed on Aug. 13, 1993.

The igniters of the prior art are relatively expensive to make and install. Additionally, they contain non-consumable materials which can produce hot particulate residue that must be removed from the generated gas to prevent its damaging the airbag during the inflation thereof. A need continues to exist for less complicated, more easily assembled igniters which provide uniform ignition, while also maintaining a high degree of safety and reliability.

DESCRIPTION OF THE INVENTION

Summary of the Invention

The present invention is directed to a novel igniter of simplified construction for use in vehicle airbag assemblies which can be economically assembled; and the gas generator, or inflator, in which the igniter is used.

An object of the present invention is to provide an igniter which can be manufactured and assembled more simply and less expensively than prior art igniters.

A further object is to provide an igniter which has fewer non-consumable parts, capable of producing a particulate residue in the generated gas, than are present in prior art igniters.

Another object is to provide an igniter wherein the igniter material is provided as a unitary body of a size and shape which is capable of being retained in its intended position without the need for an enclosed container, as is the case with prior art particulate or granular solid igniter materials.

The inventive pyrogen igniter comprises a pyrotechnic ignition material formed into a grain configuration of a size and shape permitting its installation at one of the base ends of the inflator. The igniter shape provides igniter material surrounding a clear internal passage with at least one exit port at one end thereof and an initiator at the other end.

The igniter is mounted at one end of an elongated gas generator, or inflator, which contains a gas generant material arranged around a clear ignition channel. A filtering and cooling means is arranged between the gas generant material and vent holes in the housing of the inflator. The pyrogen igniter is mounted such that, upon activation, ignition gases produced therein are expelled from the exit port, or ports, and directed into the clear ignition channel within the gas generant material where they ignite such gas generant resulting in the release of sufficient gas to inflate an associated airbag. The generated gas passes through the cooling and filtering means where it is cooled and particulates are removed. The gas then passes through the vent holes to the interior of the airbag, thereby inflating same.

DETAILED DESCRIPTION OF THE INVENTION

Figure 1A:
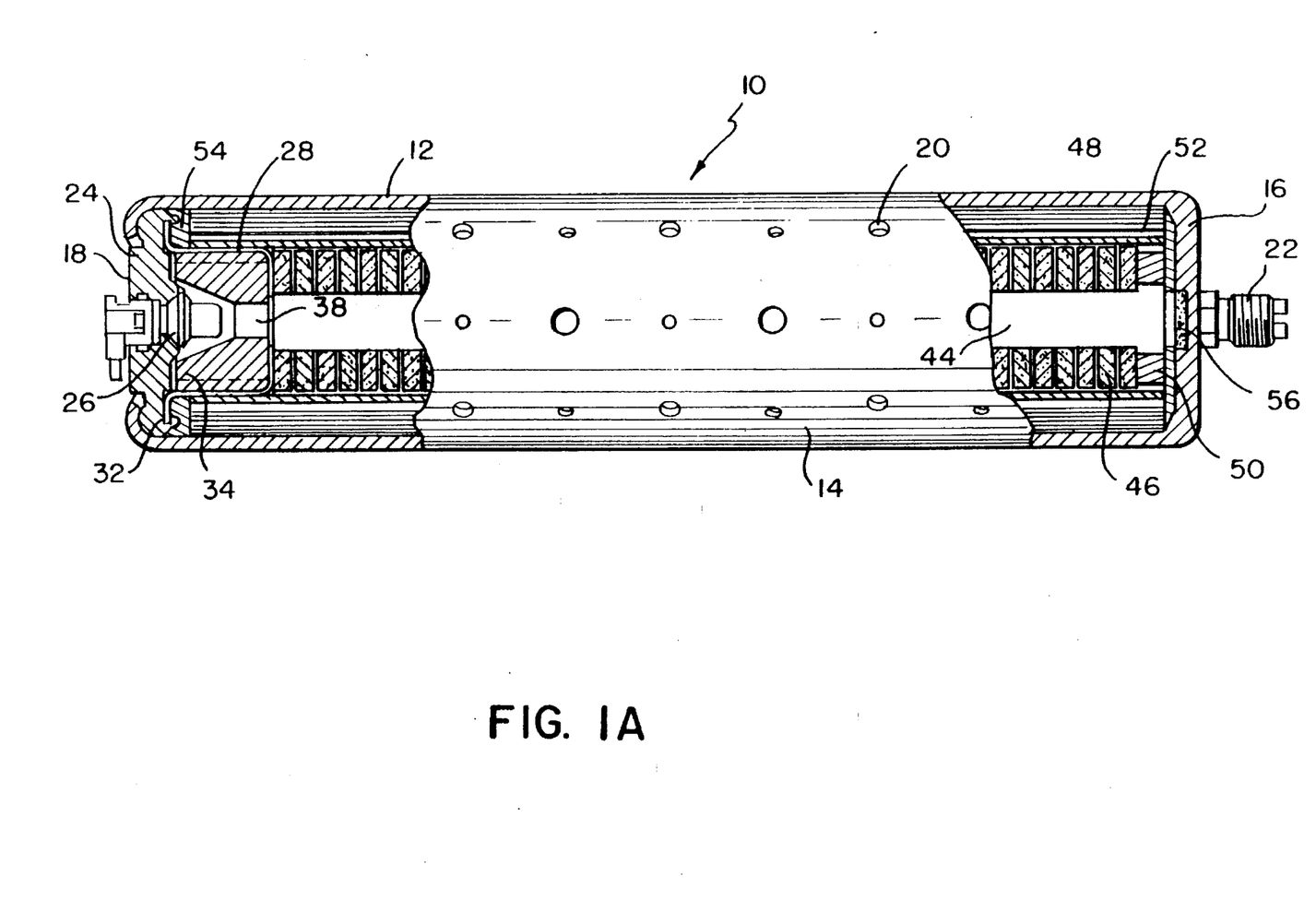
FIG. 1A is a sectional view of a gas generator for a vehicle airbag system which includes a pyrogen igniter according to the present invention.
Figure 1B:
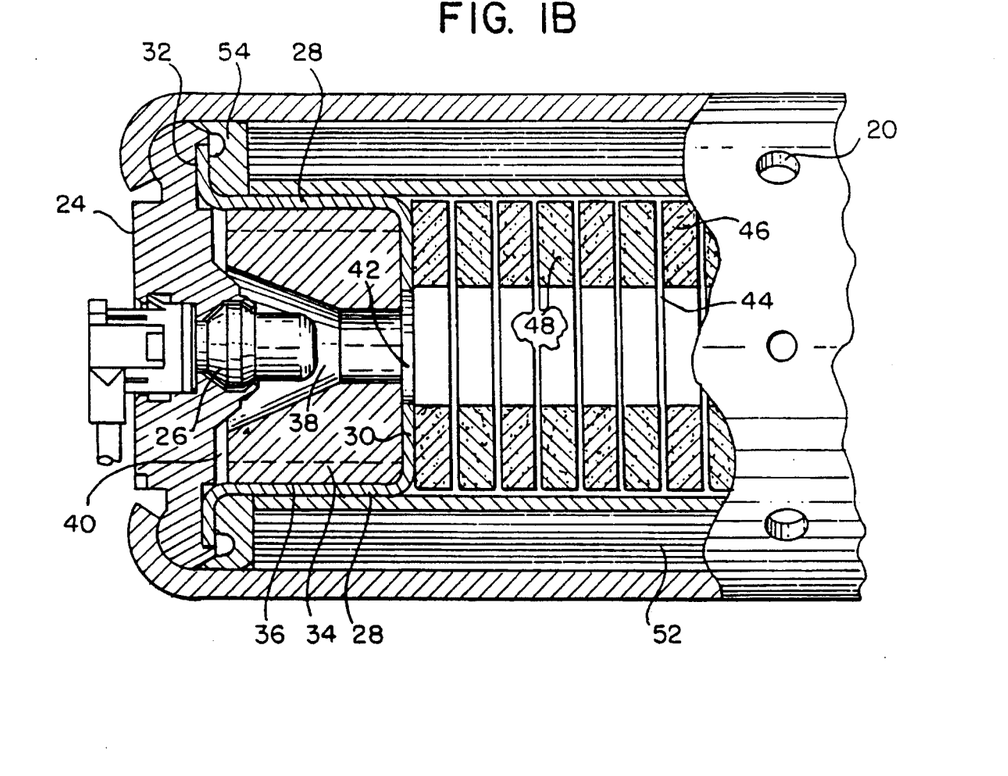
FIG. 1B is an expanded view of the pyrogen igniter in the gas generator of FIG. 1A.

A gas generator, also referred to as an inflator, which incorporates a pyrogen igniter according to the present invention is shown in FIGS. 1A and 1B. While the inflator shown is particularly suitable for use with passenger side airbag systems, the invention herein can be used to inflate airbags in other locations as well.

Inflator 10 includes an elongated, generally cylindrical metal housing 12 consisting of a cylindrical tubular side wall 14 extending between a closed end 16 and an open end 18. A plurality of openings, or vents, 20 are provided in the tubular side wall 14 to permit the outflow of gas from the inflator to an associated airbag (not shown). The openings are provided in a diametrically opposed regular pattern so that the net outflow of gas in any particular direction is balanced by a similar outflow in the opposite direction and no significant net thrust in any particular direction is developed. A stud 22 for use in mounting the inflator in an airbag system in a vehicle extends from the closed end 16 along the inflator's axis.

End closure or base plate 24 closes the open end 18 of the housing 12, such base plate having an outer diameter slightly less than the inner diameter of the cylindrical housing 12, such that it fits within said housing. The sides of the housing are roller crimped over the rounded outer edge of the base plate to provide closure of the housing. An initiator 26, typically an electric squib, for initiating ignition of the inflator upon receiving a signal, typically an electric impulse, from an associated crash sensor (not shown) mounted on the frame or body of the vehicle, is axially mounted through the base plate 24.

An igniter housing 28, generally in the form of a cylinder having an inwardly extending lip 30 at one end and an outwardly extending lip 32 at its other end, surrounds a shaped single grain of igniter material 34 at the open end 18 of the housing 12. The outwardly extending lip 32 fits within an indent provided on the inner surface of base plate 24. The single grain of igniter material 34 is shaped with a cylindrical exterior side surface 36 that fits inside the igniter housing 28, and with a central cavity 38 which axially extends from the igniter closed end 40, adjoining base plate 24, to a port 42 at its opposite end. The cavity 38 expands as it approaches closed end 40 to permit it to fit over the firing end of the initiator 26. Preferably, the transverse section, or cross section, of the single grain of igniter material is of essentially constant shape for at least a quarter of its overall length. The port 42 is defined by inwardly extending lip 30 and adjoins and opens upon an open ignition channel 44 which extends axially through the gas generant material 46 to the closed end 16 of the inflator. The port 42 is approximately the same diameter as the diameter of the open ignition channel 44 in the gas generant material 46. Port 42 is also of approximately equal transverse, or cross-sectional, area to that of the central cavity 38 of the igniter where it adjoins the cavity.

Gas generant material 46 is arranged to surround open ignition channel 44. The illustrated embodiment illustrates a preferred arrangement accomplishing by aligning, or stacking, a plurality of washer, or annular, shaped wafers 48 of the gas generant so that the aligned central holes of the wafers form the open ignition channel 44. A generant preload assembly 50 at the end of stacked wafers provides a degree of compressive resiliency to physically stabilize the stacked wafers against attrition caused by vibrations, thermal expansion or shocks as might be encountered if the assembly is accidently dropped. An annular filtering and cooling assembly 52 surrounds the outer periphery of the gas generant wafers, such that it is deployed between the outer surface of the gas generant wafers 48 and the vents 20 and extends the length of the inflator. A rubber seal 54 capable of withstanding high temperatures is provided at the end of the filtering and cooling assembly 52, which as compressed during formation of the crimp over base plate 24, assures a sealing engagement of the components at that end of the assembly and assures that the generated gas traverse the filtering and cooling assembly as intended. An auto ignition cup 56 is provided at the closed end 16 of the housing in a position generally aligned with the open ignition channel 44 extending through the gas generant wafers 48. The auto ignition cup is loaded with an auto ignition material which is selected to spontaneously ignite and combust at a temperature below that at which the structural material used in the housing substantially loses its mechanical strength. Such is provided to prevent the inflator from pressure bursting when subjected to elevated temperatures as might occur in the event of a vehicle or warehouse fire. The auto ignition material causes the inflator to activate at a lower temperature where its housing retains its strength rather than allowing it to reach a weakened condition before igniting. When aluminum is the structural material of the inflator housing, auto ignition materials which spontaneously ignite at temperatures in the range of 300° to 450° F. are suitable.

In the event of an accident, a crash sensor on the vehicle generates an electrical signal which is transmitted to the squib, or initiator 26, causing it to initiate ignition and generate heated combustion products which are released in the central cavity 38 of the grain of igniter material. The internal surface of the grain of igniter material is thereby ignited, and ignition rapidly spreads throughout the grain from its internal surface, releasing heated igniter combustion products which are then projected through the port 42 at the open end of the igniter and into the ignition channel 44 provided in the stacked gas generant wafers 48. The projected igniter combustion products rapidly traverse and occupy the entire ignition channel and contact the entire length of stacked wafers 48 causing a rapid initiation of the gas generation reaction throughout the charge of gas generant wafers. The generated gases are then caused to traverse the filtering and cooling assembly 52 wherein particulates in the generated reaction products are removed from the generated gases and the gases are cooled through the heat sink property of such assembly and the loss of energy caused by the tortuous path the generated gases must follow in traversing such filtering and cooling assembly. The filtered and cooled gases then exit the inflator through the vents 20 and are directed to the interior of the associated airbag causing it to inflate and form a pillow or balloon-like barrier between a vehicle occupant and the hard surfaces of the vehicle's passenger compartment interior.

The pyrogen igniter with its shaped unitary grain of igniter material provides advantages in the manufacture of the igniter and in its assembly into the inflator. The single unitary grain of igniter material can be formed by casting, pressing or extrusion techniques, all of which are well known mass production techniques. By providing the igniter material as a shaped unitary grain, the need to contain particulate or granular igniter material in a closed container is avoided. Moreover, by providing a relatively compact igniter shape with ignition surfaces closely adjacent the squib initiator, the need to rely on a separate fusing material, such as a length of relatively expensive rapid deflagration cord (RDC), to accomplish rapid initiation of the ignition material is avoided. Since reliable ignition requires that such RDC be accurately positioned both within the igniter, and in relation to other components in the inflator, the assembly of the RDC in the igniter and the subsequent assembly of such igniters in the inflators, requires careful processing and quality control monitoring. In contrast, the unitary grain of the pyrogen igniter can be shaped such that it is self-positioning during assembly of the inflator.

The linear igniters of the prior art generally provided granular, or particulate, ignition material enclosed in hollow metal tubes. Ignition of the ignition material resulted in irregularly shaped particulates from the tube becoming entrained in the ignition products. Such particulates had to be removed from the generated gas before it could be brought into contact with the airbag itself. The shaped grain of igniter material in the pyrogen igniter does not require complete containment within a container, and, therefore, does not produce the quantity of by-product particulates in the generated reaction products generally produced by the linear igniters of the prior art.

The capacity to provide the ignition material in specific shaped grains further provides the opportunity to optimize ignition characteristics for different ignition materials and different inflator configurations. By varying the cross section, particularly of the igniter's central cavity 38, the surface area for ignition by the squib can be varied as required to provide the desired mass flow at any given pressure. The grain shape also affects the ignition rise profile (which depicts the rate of pressure rise during the ignition phase) and can be varied to control this feature as well. The ability to optimize the ignition characteristics of the different ignition materials by varying the cross section of the grain in the present pyrogen igniters should avoid the creation of shock waves which are capable of breaking the gas generant material.

Figure 2A:
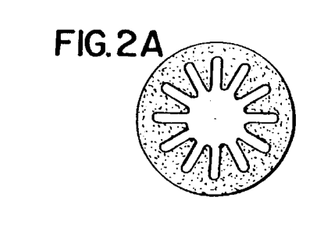
FIGS. 2A through 2L illustrate various transverse sections of unitary grains of igniter material which could be used in the pyrogen igniter of this invention.
Figure 2B:
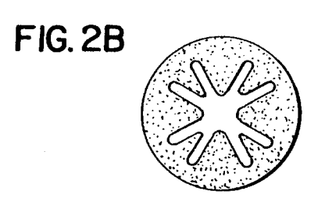
Figure 2C:
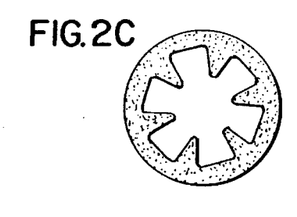
Figure 2D:
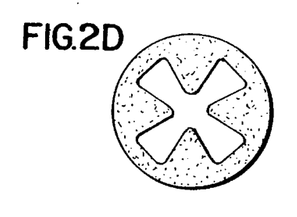
Figure 2E:
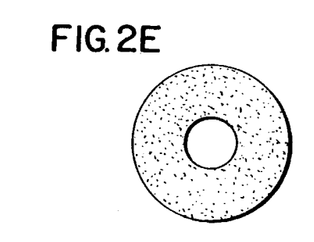
Figure 2F:
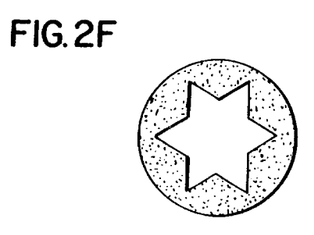
Figure 2G:
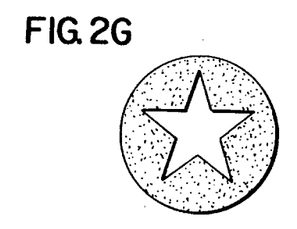
Figure 2H:
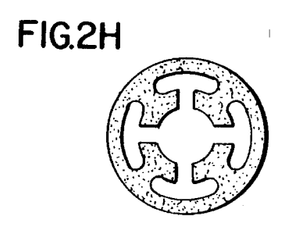
Figure 2I:
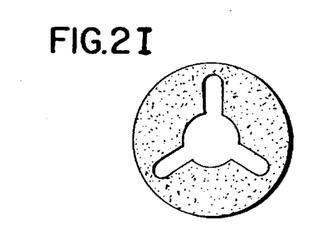
Figure 2J:
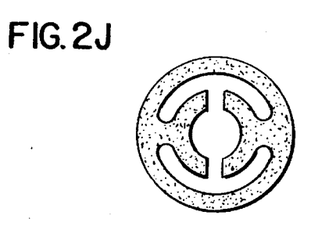
Figure 2K:
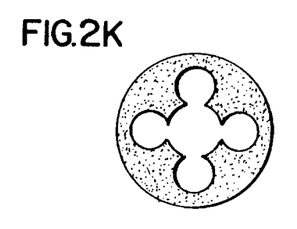
Figure 2L:
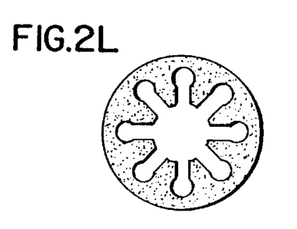

FIGS. 2A through 2L illustrate various igniter grain shapes which could be useful in particular applications of pyrogen igniters. The illustration is not all inclusive. Generally, the greater the interior surface area of the igniter grain, the higher will be the rate of mass flow and the initiation of ignition. Also, the sharper the meeting, or juncture, of two internal surfaces of the grain, the more reliable will be the ignition of the grain at that juncture of surfaces. As illustrated in FIGS. 2F and 2G the transverse section, or cross-section, of the unitary grain can define a cavity having a star-like shape; or, as illustrated in FIGS. 2A, 2B, 2H, 2I, 2J and 2L, the unitary grain can define an interior cavity containing slots which extend radially into the grain from a generally circular cavity located in the center of the grain.

Figure 3:
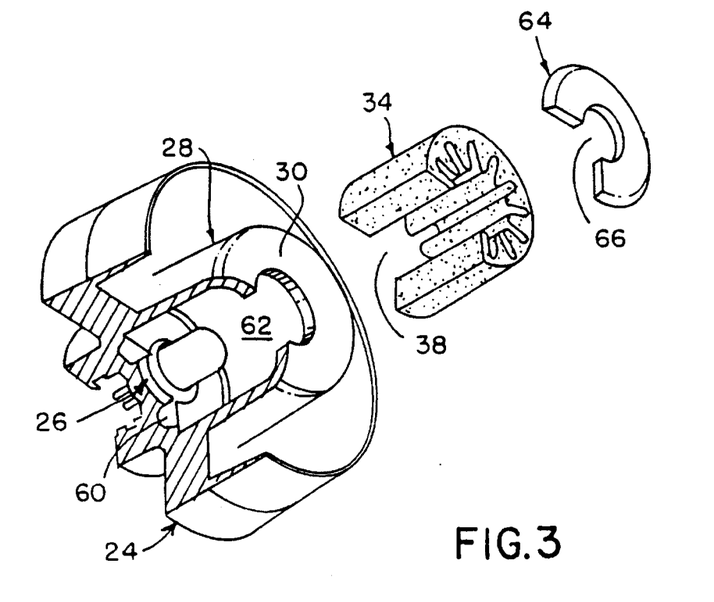
FIG. 3 is an exploded view, partially in section, of a "high-pressure" pyrogen igniter according to the present invention.

Two basic types of pyrogen igniters result from coordination of the particular igniter material used with the size of the exit port, or ports, at the open end 42 of the igniter. The size of such port(s) affects the pressure developed in the central cavity 38 of the igniter and the mass flow rate of the igniter combustion products. The smaller the cross-sectional area of the port, the greater will be the pressure developed in the cavity, and the faster will be the burn rate of the ignition grain. Accordingly, ignition materials for use in pyrogen igniters can be selected based principally on output properties other than their burn rate, and the size of the exit port adjusted to provide the required burn rate. One of the basic types, a high-pressure pyrogen igniter, is shown in FIG. 3. The other basic type, a low-pressure pyrogen igniter, is depicted in FIG. 1, and a further embodiment of such type is illustrated in FIG. 4. While two basic types of igniters are described, it should be understood that modification of the recognized result effective variables will provide a range of igniters having a continuous range of characteristics between those of the so-called "high-pressure" type and those of the so-called "low-pressure" type.

The high pressure pyrogen igniter illustrated in exploded form in FIG. 3 includes base 24, initiator 26, igniter housing 28 and igniter grain 34. This embodiment also provides an auto-ignition material 60 in a recess in base 24 surrounding the initiator 26. In the event the auto-ignition material is caused to ignite, its proximity to the igniter grain assures that the grain will ignite causing activation of the inflator. Moreover, the auto-ignition material will ignite and assist normal initiation by initiator 26. The housing is characterized by the port 62 at its open end having a substantially smaller transverse, or cross-sectional, area than the transverse, or cross-sectional, area of the igniter's central cavity 38 adjacent the port. Such opening could be further modified and restricted by the optional nozzle throat insert 64, with its nozzle 66 of even smaller transverse area. The restricted port 62 in conjunction with (a) the igniter housing 28 and base 24 defining a relatively small available volume and (b) only permitting escape of the igniter combustion products from the central cavity 38 through port 62, provides a pressure chamber which produces a larger pressure buildup during the combustion of the igniter grain than would be provided if the combustion products were not so confined. Creation of a higher pressure promotes a more rapid burn of the igniter grain. Thus, such a high-pressure pyrogen igniter is particularly suitable for use with igniter materials which have a relatively slow burn rate, coupled with other desirable output properties. Pressure within the igniter is also affected by the burn slope (which depicts the change in burn rate relative to pressure) and the burning surface area, either or both of which could also be varied to vary the igniter pressure.

The illustrated high-pressure igniter is assembled by initially providing the walls of the igniter housing 32 in tubular, or constant diameter, form. The igniter grain 34 and, optionally, the nozzle throat insert 64, are placed within the tubular shaped walls, which are then roller crimped to provide an inwardly extending lip 30 which terminates at port 62. The resulting igniter provides the walls of the housing, the closing structure and the rim as a unitary structure which provides a particularly advantageous housing for the high pressure pyrogen igniters.

In the low-pressure pyrogen igniter of FIG. 1A–1B, the port 42 provided at the open end of the igniter is defined by inwardly extending lip 30 of igniter housing 28. The port is approximately the same size as the diameter of the ignition channel 44 provided in the gas generant wafers 48 and provides approximately the same transverse, or cross-sectional, area as the transverse, or cross-sectional, area of the central cavity 38 of the igniter grain 34 adjacent such port. Since this configuration does not significantly restrict the escape of combustion products from the igniter's central cavity, it produces a relatively low igniter pressure and does not require as strong a housing as is required in the high-pressure pyrogen igniter of FIG. 3. Low-pressure pyrogen igniters are particularly suitable for use with igniter materials having a relatively high burn rate.

Certain igniter materials may demonstrate good igniter properties except for demonstrating less than total ignition reliability. The ignition of an igniter grain made of such an igniter material can be enhanced by a momentary pressure surge in the igniter grain cavity as the first products of the initiator firing are discharged into the cavity. An elevated pressure generally provides for more reliable ignition. A thin rupturable film placed over the opening or port 42 at the igniter's open end will provide a momentary surge in the cavity pressure when the initiator first fires. The pressure surge is relieved when the film ruptures. The momentary pressure surge, however, will provide an enhanced degree of ignition reliability. Such a film could be provided from a thin metal, such as aluminum foil, a ceramic, or from a consumable material, such as cellulose or a plastic, which should be selected from those which do not produce toxic combustion products.

Figure 4A:
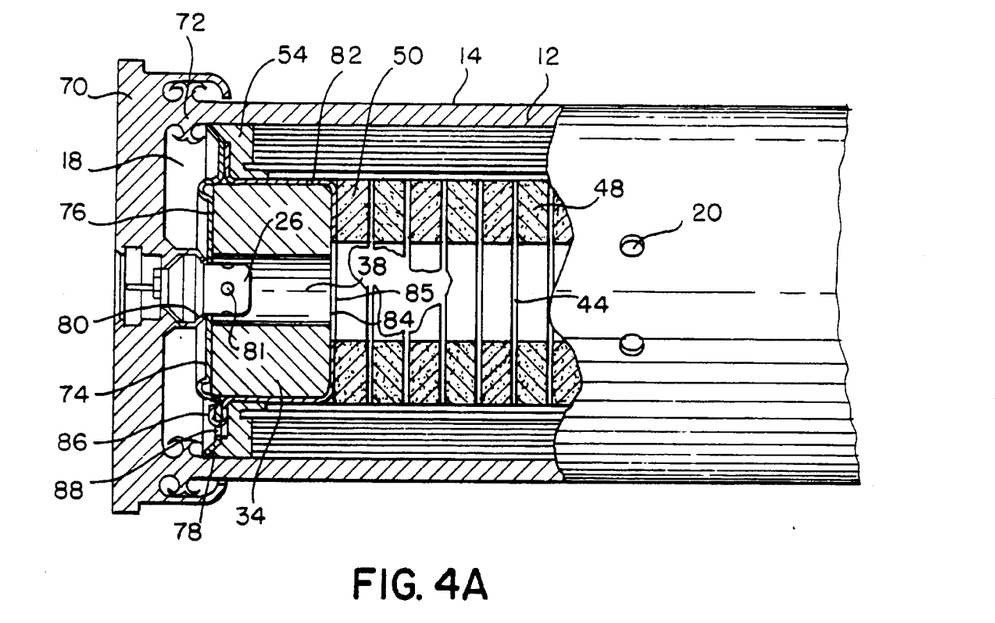
FIG. 4A is a sectional view of another gas generator which uses a pyrogen igniter according to this invention.
Figure 4B:
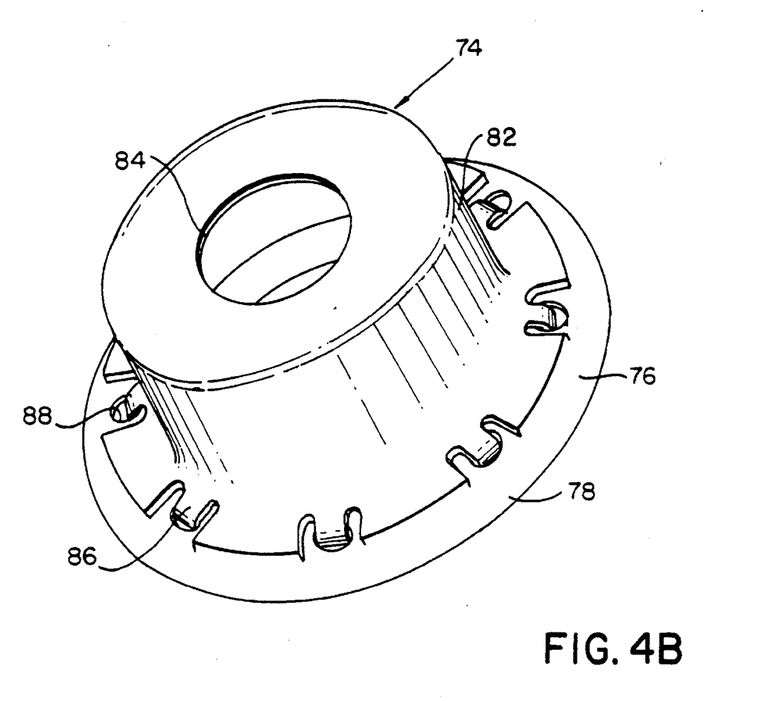
FIG. 4B is a view of the igniter housing used in the gas generator of FIG. 4A.

Another embodiment of an inflator using a low-pressure pyrogen igniter is illustrated in FIG. 4A. Items in this figure which correspond to items shown in the embodiment of FIGS. 1A–1B are designated by the same item numbers. In this embodiment, the open end 18 of the inflator housing 12 is closed by base 70. Such closure is accomplished by welding abutting circular shaped surfaces of the base and the housing at 72, preferably by an inertial welding process. The solid grain of igniter material 34 is provided in a separate igniter housing 74 which can be assembled at a remote location and then assembled into the inflator by being press fit in the inflator housing prior to the inertial welding step. The igniter housing 74, as also shown in FIG. 4B, comprises a closing element at its closed end, such as igniter housing base plate 76. The base plate includes circumferential rim 78, which rim forms an interference fit with the internal diameter of the side wall 14 of the inflator housing 12. The rim is provided at an angle, as illustrated, which assists its insertion in the inflator housing, while providing enhanced resistance to its removal therefrom. Igniter housing base plate 76 has a centrally oriented opening 80 through which the firing end of the initiator, or squib, 26, which is mounted in base 70, is inserted, during assembly of the base 70 with the remainder of the gas generator. The initiator illustrated in this embodiment is a side firing squib wherein the combustion products produced in the initiator are discharged from a plurality of ports 81 arranged around the outside of its firing end. The initiator's combustion products are thereby directed toward the interior surfaces of the unitary grain of igniter material, enhancing the ignition thereof. Preferably such a side firing squib has 2 to 8 ports arranged around the outside of its firing end. Igniter housing 74 also includes a generally cup shaped element 82 which encircles and contains the solid grain of igniter material 34. Element 82 also includes an opening 84 which communicates with the ignition channel 44 provided in the center of the stacked gas generant wafers 48. In the embodiment illustrated in FIG. 4A, a rupturable diaphragm 85, of such as aluminum foil, is initially provided over the opening to provide, upon activation, an initial pressure surge, and the enhanced degree of ignition reliability attributable thereto. The port defined by the opening 84 in the igniter housing 74 is approximately the same diameter as the diameter of the open ignition channel 44 in the gas generant wafers 48 and is approximately of equal transverse, or cross-sectional, area to that of the central cavity 38 of the igniter grain.

The igniter housing 74 is assembled by placing the solid grain of igniter material within element 82 and then fitting circumferentially arranged tabs 86 on element 82 through corresponding holes 88 provided in the igniter housing base plate 76, and bending the tabs to form a gripping relationship with the base plate. The igniter housing can then be inserted in the tubular side wall of the gas generator, which would have previously been loaded with the components located closer to its closed end. The use of such a housing is particularly advantageous in inflators which use welding in their assembly process, since the igniter housing provides an effective heat shield between the weld and the ignition and gas generant materials during the welding process. Once the igniter housing is assembled in an interference fit relation with the tubular side wall of the gas generator, that subassembly is welded, preferably by inertial welding, to base 70, which is preassembled with the initiator, or side firing squib 26.

The igniter material used to form the igniter grain can be any of the known igniter materials. The igniter grain can be formed by well known casting, pressing or extrusion processes. The fabrication of linear igniters by similar techniques is disclosed in two prior applications involving two of the present inventors, Ser. No. 08/392,578, entitled "Linear Igniters For Airbag Inflators", and Ser. No 08/392,570, entitled "Gas Generation and Ignition System For Airbag Inflation", both of which were filed on Feb. 23, 1995, and both of which are commonly assigned with this application. These two applications are hereby incorporated by reference herein. Extrusion is generally preferred since it will produce columnar forms of the grain the size of which can be readily modified by cutting such column at any desired length. Virtually any of the known igniter materials can be extruded provided such possess appropriate plasticity at the temperatures and pressures used in the extrusion process. Such plasticity can result either from the melting of one or more components, from the ability of one or more components to deform at the extrusion conditions, or by the addition of a solvent or suspending medium (such as water) which can be volatilized from the finished extruded product. The conventional mixture of 25% finely divided boron and 75% potassium nitrate can be provided as an extrudable mixture by mixing with methanol and water, with the possible addition of a binder, such as either bentonite or nylon dissolved in a solvent, and the further possible addition of reinforcing fibers of either fiberglass or graphite. While the extruded product is a unitary solid, in its dried or cured form it will contain a degree of porosity resulting in a variable degree of effective surface area for any given shape of igniter. The greater the effective surface area, the faster will be the igniter burn rate. Accordingly, control of the porosity of the extruded igniter grain provides further control over the burn characteristics of such igniter.

The dispersal of fine particles of metal or metalloid powders throughout the igniter grain appears to enhance heat transfer from the igniter to the gas generant. Metal or metalloid powders of, such as, magnesium, aluminum, titanium, zirconium and boron, having a particle size in the range of 5 to 100 microns, preferably in the range of 5–50 microns, provided throughout the igniter grain are particularly effective.

Preferably, the unitary igniter grain is provided as a single-piece solid grain, such as is produced by cutting off a single length of a columnar extrusion. However, essentially the same effect could be provided by providing two or more shorter lengths of the same extrusion and then securing them in an abutting end to end stack, resulting in an essentially identical grain configuration to that of the longer one-piece unitary grain. Similarly, two or more pieces in complementary shapes, which when placed together provide a grain configuration essentially identical to the unitary grain configurations herein disclosed, could be secured together by such as adhesives or fasteners, or by a complementary housing encircling or otherwise holding the pieces in the desired shape, or by mating male and female portions provided in the two or more pieces. These, and similar, obvious techniques for providing the same basic performance as would be provided by a one-piece igniter grain in the specified shape are included within the scope of the "unitary igniter grain" as that phrase is used herein. As used in this phrase the term "unitary" should be interpreted as "having the nature of a unit or used as a unit".

The gas generant may be any of a number of known compositions having the recognized requirements of burning rate, flame temperature and non-toxicity. Some such compositions are disclosed in U.S. Pat. No. 4,203,787 to Schneiter et al., which is hereby incorporated by reference herein. A preferred composition comprises about 65% to about 70% by weight of a metal azide, about 27% to about 33% molybdenum disulfide, and up to about 4% sulfur; and, more particularly, a composition comprising about 68% by weight sodium azide, about 30% molybdenum disulfide and about 2% sulfur.

The gas generant preferably is in the form of annular wafers with a central opening having a diameter approximately the size of, or larger than, the port at the open end of the igniter. Preferably, space is maintained between individual wafers by such as raised spacers provided on their sidewalls. One specific wafer embodiment provides wafers with an outside diameter of 1.44 inches, a central opening of 0.5 inches and a thickness of about 0.15 inches.

Those of ordinary skill in the art will recognize that various modifications can be made to the specific embodiments described herein without departing from the spirit of the described pyrogen igniter invention. It is not intended that the scope of the invention be restricted to the specific embodiments described herein. Rather, it is intended that the scope of the invention be limited only in accord with the following claims and the equivalents thereof.

We claim:

1. A gas generator for a vehicle airbag system, comprising:
    an elongated housing having gas outlet openings therein,
    a combustion chamber containing an arrangement of a pyrotechnic gas generant material,
    said arrangement providing an essentially open ignition channel into the interior of said gas generant material,
    an igniter located adjacent said arrangement,
    said igniter comprising an initiator and a unitary grain of an igniter material within an ignitor housing, said unitary grain being formed from an ignitor material that has been cast, pressed or extruded into a shaped unitary structure the periphery of which is commensurate with the interior walls of said ignitor housing,
    said unitary grain of igniter material containing a cavity, the walls of which partially define an ignition chamber,
    said ignition chamber containing at least one port through which the ignition products of said igniter material can be discharged,
    said igniter and arrangement of gas generant material being located within the gas generator such that ignition and burning of the igniter material will produce hot ignition products which discharge through said at least one port and are directed into said open ignition channel to heat the gas generant material to its ignition temperature causing it to generate gas which flows to and through said gas outlet openings.

2. The gas generator of claim 1, wherein said arrangement of gas generant material comprises annular wafers having a central opening.

3. The gas generator of claim 2, wherein said annular wafers are provided in an aligned arrangement whereby their central openings form said open ignition channel.

4. The gas generator of claim 1, wherein said at least one port is adjacent said open ignition channel.

5. The gas generator of claim 1, wherein said open ignition channel extends from adjacent said at least one port through said arrangement of gas generant material.

6. The gas generator of claim 1, wherein said unitary grain of igniter material comprises a length of an extruded igniter material.

7. In a gas generator for a vehicle airbag system, comprising:
    a housing having gas outlet openings, and containing a body of pyrotechnic gas generant material, said body of gas generant material having a clear ignition channel extending into its interior,
    an igniter containing igniter material and having an exit opening,
    an initiator operable to ignite said igniter material,
    said exit opening of said igniter being located adjacent said clear ignition channel in said gas generant material,
    whereby, ignition and burning of the igniter material produce hot ignition products which flow through said exit opening and into said clear ignition channel where they ignite said gas generant material,
    the improvement comprising:
    providing said igniter material as a solid unitary grain of igniter material within an ignitor housing, said unitary grain being formed from ignitor material that has been cast, pressed, or extruded into a shaped unitary structure the periphery of which is commensurate with the interior walls of said ignitor housing and having a central cavity in flow communication with said exit opening.

8. An igniter for igniting the gas generant material in vehicle airbag systems, comprising:
    a housing comprising metal walls extending about a compartment within said housing, one end of said housing having a rim extending inwardly from said walls, said rim defining at least one opening from said compartment, and second end structure opposite said one end,
    a unitary grain of igniter material provided within said compartment, said unitary grain being formed from ignitor material that has been cast, pressed or extruded into a unitary structure shaped such that its peripheral exterior sides are substantially commensurate with the interior walls of said housing, said grain of igniter material having a cavity extending generally through the central portion of said compartment from said one end to said second end, said cavity defining the interior surfaces of said unitary grain, and
    an initiator capable of igniting said igniter material at said interior surfaces,
    whereby ignition and burning of the igniter material causes an expulsion of hot igniter combustion products from said at least one opening.

9. The igniter of claim 8, wherein the exterior shape of said unitary grain of igniter material is cylindrical and the transverse section of said cavity has an essentially constant shape extending at least a quarter of the length of said grain.

10. The igniter of claim 9, wherein said cavity is expanded at its end adjacent said second end of the compartment.

11. The igniter of claim 10, wherein said expanded portion of said cavity surrounds at least part of said initiator.

12. The igniter of claim 9, wherein said transverse section of said cavity has a star-like shape.

13. The igniter of claim 9, wherein said grain includes slots extending into the grain radially from a generally circular cavity located substantially in the center of the grain.

14. The igniter of claim 9, wherein said housing includes mounting means for mounting the housing to the inflator of an airbag assembly.

15. The igniter of claim 14, wherein said mounting means are integral with said housing.

16. The igniter of claim 14, wherein said mounting means provide an interference fit with the inflator housing.

17. The igniter of claim 8, wherein said unitary grain of igniter material comprises extruded igniter material.

18. The igniter of claim 8, wherein said igniter material comprises boron and potassium nitrate.

19. The igniter of claim 8, wherein said igniter material comprises fine particles of a metal or metalloid selected from the group consisting of magnesium, aluminum, titanium, zirconium and boron.

20. The igniter of claim 8, wherein said housing includes surfaces configured to form a connection with mating surfaces on the inflator housing.

21. The igniter of claim 8, wherein said initiator extends through said end structure and into said cavity.

22. The igniter of claim 21, wherein said initiator includes a plurality of ports through which the combustion products produced in the initiator are directed toward the interior surfaces of said unitary grain.

23. The igniter of claim 22, wherein said initiator is a side firing squib having from 2 to 8 of said ports.

24. The igniter of claim 21, wherein said initiator is mounted to said end structure.

25. The igniter of claim 8, wherein the area defined by said opening is at least equal to the area of the transverse section of said cavity where said cavity adjoins said opening.

26. The igniter of claim 8, wherein said walls of said housing, said rim and said end structure comprise a unitary structure.

27. The igniter of claim 8, wherein a flange extends outwardly from said walls adjacent said second end of said compartment.

28. The igniter of claim 8, wherein the inner edge of said rim defines a single opening through which the axis of said cavity passes.

29. The igniter of claim 8, wherein an auto ignition material which ignites upon reaching a temperature in the range of 300° to 450° F. is provided in said igniter at a location adjoining said cavity.

30. The igniter of claim 29, wherein said auto ignition material is provided adjacent said initiator.

31. The igniter of claim 8, wherein an insert defining a nozzle opening is provided adjacent said rim with said nozzle opening aligned with said at least one opening.

32. The igniter of claim 8, wherein a thin rupturable diaphragm is provided adjacent said rim and extending over said at least one opening, whereby upon activation of said initiator said diaphragm restricts the discharge of combustion products from the igniter until the pressure develops sufficiently to cause said diaphragm to rupture.

33. The igniter of claim 32, wherein said thin rupturable diaphragm is made of a material selected from the group consisting of metal, plastic, cellulose or ceramic.

* * * * *